(No Model.)

F. A. FINCH.
VEHICLE WHEEL.

No. 518,881. Patented Apr. 24, 1894.

Witnesses:
John Enders Jr.
W. J. Sankey.

Inventor,
Frederick A. Finch,
by
Higdon Higdon & Longan
Attys.

United States Patent Office.

FREDERICK A. FINCH, OF ST. LOUIS, MISSOURI, ASSIGNOR OF ONE-THIRD TO GEORGE H. MILLER, OF SAME PLACE.

VEHICLE-WHEEL.

SPECIFICATION forming part of Letters Patent No. 518,881, dated April 24, 1894.

Application filed August 21, 1893. Serial No. 483,677. (No model.)

*To all whom it may concern:*

Be it known that I, FREDERICK A. FINCH, of St. Louis, State of Missouri, have invented certain new and useful Improvements in Expansion Vehicle-Wheels, of which the following is a full, clear, and exact description, reference being had to the accompanying drawings, forming a part hereof.

My invention relates to an improvement in "expansion vehicle wheels" and consists in the novel arrangement, combination and construction of parts as will be more fully hereinafter described and designated in the claims.

Figure 1:
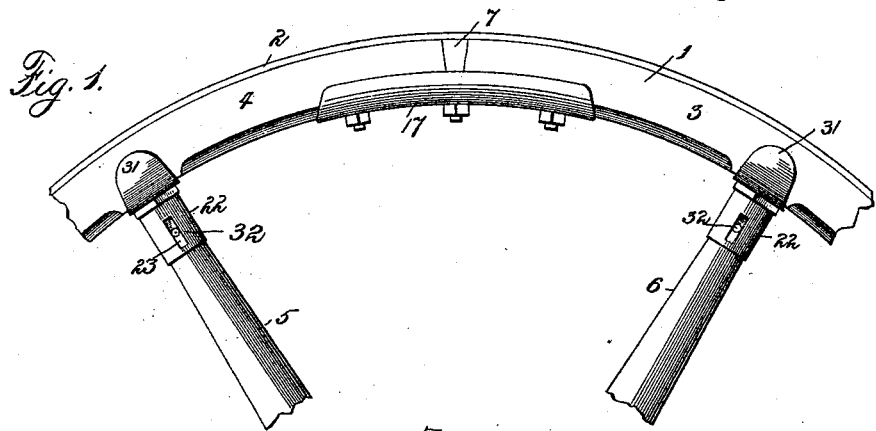
Figure 2:
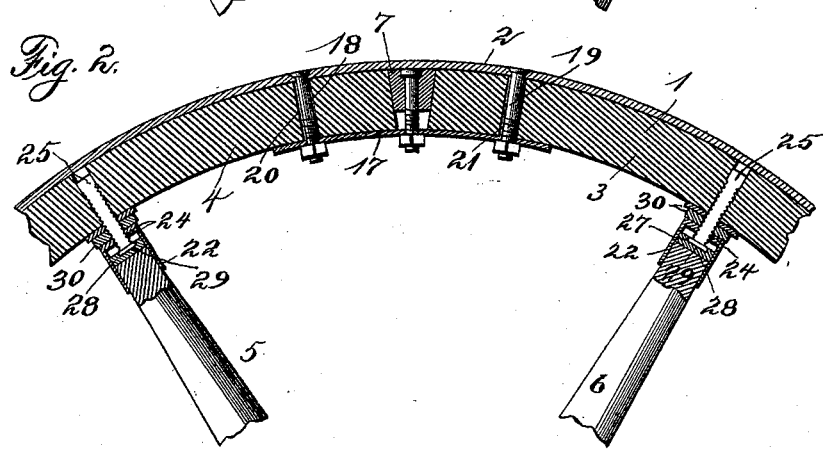
Figure 3:
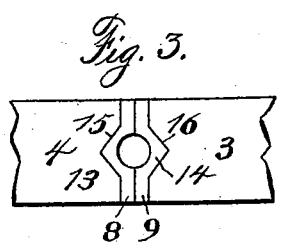
Figure 4:
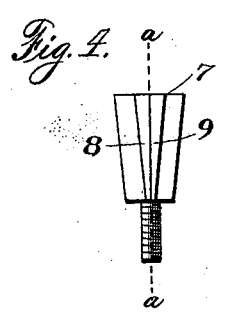
Figure 5:
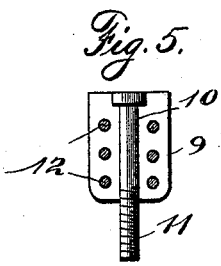
Figure 6:
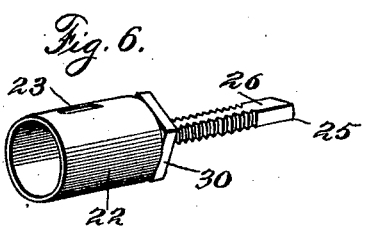
Figure 7:
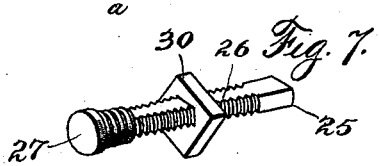

In the drawings: Figure 1 is a side elevation of a portion of a wheel showing my invention applied thereto. Fig. 2 is a longitudinal central section of Fig. 1. Fig. 3 is a plan view of a portion of a wheel with the tire removed. Fig. 4 is a detail side elevation of a wedge which I use in carrying out my invention. Fig. 5 is a longitudinal central section through the line A—A of Fig. 4. Fig. 6 is a detail view in perspective more clearly showing a tightening-device which I use in carrying out my invention. Fig. 7 is a detail view in perspective of a screw-threaded shaft which I use in the tightening device.

1 indicates a portion of a vehicle-wheel which is constructed with a tire 2, segments 3 and 4 of the felly and spokes 5 and 6. Located between the segments 3 and 4 of the felly is a wedge 7 which is constructed of two pieces 8 and 9. Longitudinally formed through this wedge is a bore 10 to allow a bolt 11 to be inserted therein. The pieces 8 and 9 of the wedge 7 are held together by rivets 12. Formed on the sides of the wedge as shown in Fig. 3 are projections 13 and 14 which engage grooves 15 and 16 which are formed in the adjacent ends of the segments 3 and 4 of the felly.

17 indicates a strengthening plate located as shown in Figs. 1 and 2 and held in position by bolts 18 and 19. These bolts pass through the tire 1 having their heads countersunk in said tire and through slots 20 and 21 which are formed in the adjacent ends of the segments 3 and 4 of the felly. Located loosely on the ends adjacent the felly of the spokes is a ferrule 22 one end of which is closed the opposite end being open to engage the end of the spoke. The construction of these ferrules being the same I will describe but one of them. Located in the side of the ferrule 22 is a longitudinal slot 23 the purpose of which will be hereinafter more fully described. The closed end of the ferrule 22 is provided with a screw-threaded aperture 24 to allow a screw-threaded shaft 25 to pass through. This shaft 25 is constructed with flattened sides 26 and a head 27 on the end adjacent the spoke. This shaft passes through an opening in the felly as shown in Fig. 2.

Located in the ferrule 22 adjacent its closed end is a washer 28 which is constructed with a depression 29 in one side to allow the head 27 of the bolt 25 to be placed therein.

30 indicates a nut which is constructed to be engaged by a wrench and is longitudinally loosely mounted on the screw threaded shaft 25 and so constructed that when it is turned it will turn said shaft.

31 indicates a thin piece of metal which is located between the nut 30 and the felly to prevent the nut from wearing said felly.

32 indicates a pin which is connected to the side of the spoke adjacent its end and so located as to engage the slot 23 of the ferrule 22 to prevent said ferrule from turning.

The operation is as follows: When the tire becomes loose, as is often the case in vehicle wheels, the operator draws the wedge 7 down by the bolt 11 which separates the segments 3 and 4 of the felly and expands said felly against the tire. The slots 20 and 21 in the adjacent ends of the segments 3 and 4 will readily allow the segments to be separated as can be clearly seen by inspecting Fig. 2. By expanding the felly it will loosen the spokes. To lengthen and tighten the spokes the operator applies a wrench to the nut 30 and turns it in the required direction, which will draw the closed end of the ferrule 22 against the felly.

What I claim is—

1. A wedge for expanding vehicle wheels constructed of two pieces 8 and 9 held together by rivets 12, and projections 13 and 14 formed on the opposite sides of said pieces, substantially as set forth.

2. An expansion vehicle wheel constructed with a ferrule one end of which is closed and provided with a screw threaded aperture therein, a washer located in said ferrule, a screw-threaded shaft constructed to engage the screw threaded aperture in the closed end of the ferrule, and means for operating the same, substantially as set forth.

3. A tire tightener, consisting of a ferrule 22 which is constructed with one end closed, a slot 23 formed in the side of said ferrule, a screw-threaded shaft 25 constructed with a flattened portion, a head 27 formed on one end of said shaft to engage a washer 28, and means for operating the same, substantially as set forth.

4. In combination with a vehicle wheel, a ferrule 22 adjustably located on the end of the spoke, a washer 28 located in said ferrule adjacent the end of the spoke, a screw threaded shaft 25 having an enlarged head 27 formed thereon which is constructed to pass through the closed end of said ferrule and engage said washer, a nut 30 so constructed that when it is turned it will turn the screw-threaded shaft, all arranged and combined to operate in the manner set forth.

In testimony whereof I affix my signature in presence of two witnesses.

FREDERICK A. FINCH.

Witnesses:
EDWARD EVERETT LONGAN,
JNO. C. HIGDON.